United States Patent [19]

Hillström et al.

[11] Patent Number: 4,676,615
[45] Date of Patent: Jun. 30, 1987

[54] PROJECTING DEVICE

[75] Inventors: Kennert Hillström, Mölnlycke; Lennart Stalfors, Hindas, both of Sweden

[73] Assignee: Victor Hasselblad AB, Gothenburg, Switzerland

[21] Appl. No.: 783,244

[22] Filed: Oct. 2, 1985

[30] Foreign Application Priority Data

Oct. 2, 1984 [SE] Sweden ............................. 8404908

[51] Int. Cl.⁴ ............................................. G03B 21/14
[52] U.S. Cl. ....................................... 353/101; 411/397
[58] Field of Search ............... 353/100, 101; 248/413, 248/188.4, 354.4, 672, 676, 371, 397, 398; 411/396, 397

[56] References Cited

U.S. PATENT DOCUMENTS

| | | | |
|---|---|---|---|
| 2,366,554 | 1/1945 | Peck et al. | 353/101 |
| 2,598,573 | 5/1952 | Lutes | 353/101 |
| 3,191,491 | 6/1965 | Pignone et al. | 353/101 |
| 3,712,725 | 1/1973 | Eckerdt | 353/101 |
| 3,963,337 | 6/1976 | Lundberg | 353/101 |

FOREIGN PATENT DOCUMENTS 2419905 10/1975 Fed. Rep. of Germany ...... 353/101

Primary Examiner—Charles Frankfort
Assistant Examiner—Patrick R. Scanlon

[57] ABSTRACT

Projecting device for presentation of pictures and of a kind which includes a lockable transport safety device (4, 10, 21) for members (8) which are movable for adjustment purposes and which are of such weight and form that they require the safety against shocks and vibrations. For the adjustment an adjustment device is provided having an operating member (17). The transport safety device (4, 10, 21) is so arranged that it for locking purposes requires a locking element (21). This locking element also is provided to alternatively accomplish a movement of the adjustment device (3) when operating the operating member (17) for the adjustment, whereas the adjustment device (3) being released from actuation from the operating member (17), when the locking element (21) is positioned in the transport safety device (4, 10). In this way no adjustment can take place, when the transport safety device is locked.

3 Claims, 1 Drawing Figure

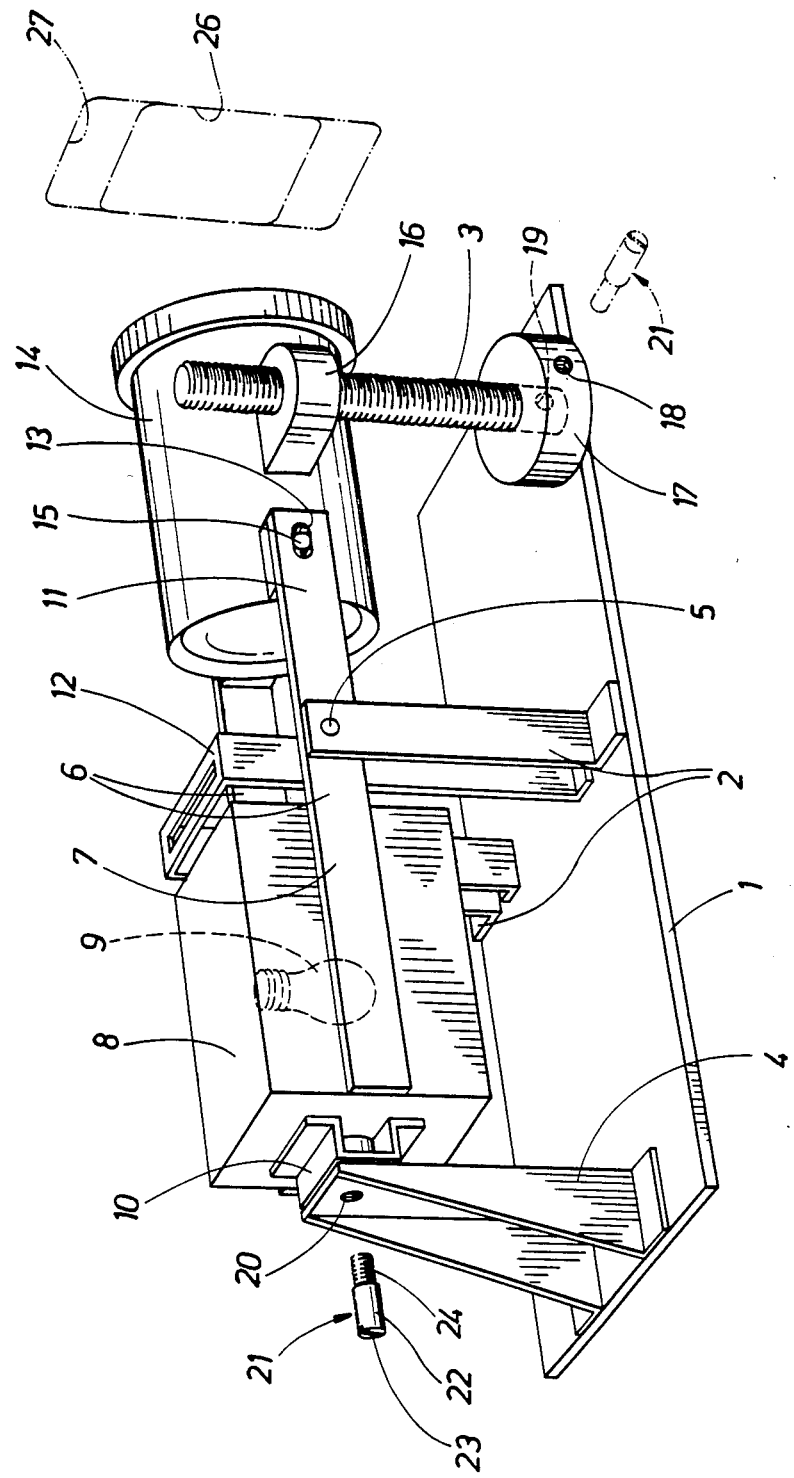

PROJECTING DEVICE

The present invention relates to a projecting device for presentation of pictures and of a kind which includes a lockable transport safety device for members which are movable for adjustment purposes and which are of such weight and form that they require said safety against shocks and vibrations and for said adjustment means are provided having operating means.

In connection with projecting apparatus provided for display of pictures of the kind indicated above certain adjustment means are present which are provided with operating means. Further safety devices are present which are to lock the adjustment means in connection with transport of the projecting apparatus. In this way it is possible to avoid that the adjustable members of the projecting apparatus are displaced as a result of shocks and vibrations during the transport in such a way that damages occur.

However it has appeared that the operating means by mistake often are actuated by somebody when the transport safety device is locked. This may result in that members of the projecting apparatus are broken by the fact that those members which were to be displaced by means of the operating means through the adjustment means are locked against such displacement.

The object of the present invention is to accomplish a device which protects the projecting apparatus against such damages which can arise by unintentional actuation of the operating means when the transport safety device is in its locked position.

The object of the present invention is obtained by a projecting device which is characterized therein that the transport safety device is so arranged that it for locking purposes requires a locking element and that said locking element also is provided to alternatively accomplish a movement of said adjustment means when operating the operating means for said adjustment, whereas said adjustment means being released from actuation from said operating means, when said locking element is positioned in said transport safety device.

An embodiment of the projecting device according to the present invention is shown in the accompanying drawing where the projecting devide is shown in a perspective view.

The illustration of the projecting device in the FIGURE is limited to certain internal members and a base plate. However no housing is shown. A projecting apparatus reduced to the shown members can per se be utilized for presentation of pictures but usually a housing is included. However this is insignificant in the present situation and has therefore been deleted for the purpose of clarity.

According to the FIGURE the projecting apparatus includes a base plate 1, two bearing brackets 2 projecting from the base plate and an adjustment means 3 pivotally journalled in the base plate. The base plate 1 supports a picture holder 12, which has respect to the position of the picture plane, when a picture is inserted into the holder, is positioned opposite to the shafts 5. The base plate 1 also supports a first transport support member 4.

In the bearing brackets by means of said two short axis 5 (only one of them is shown) two bars 6 are pivoted, said bars forming double armed lever arms. One arm of each bar, which in the following is called the rear arm 7, supports a light house 8, which contains a lamp 9 with conventional auxiliary equipment such as mirror and condensor (not shown). The extreme end of the light house 8 supports a second transport member 10.

The second arm of each bar 6, which in the following is called forward arm 11, is in its extreme end provided with an oblong hole 13, which connects the bar with an objective unit 14 through a pin 15 for each bar. The objective unit is by means of an ear 16 connected to the adjustment means 3. The adjustment means 3 consists of a screw which is threaded to the ear 16.

The adjustment means 3 supports an operating means 17 in the form of a wheel. In the wheel there is a hole 18 which extends radially close to a corresponding hole 19 in the end of the adjustment means 3 which is not threaded. The hole 19 but not the hole 18 is threaded. In the first transport support part 4 a hole 20 is arranged which has the same diameter as the hole 18 in the operating means. This hole corresponds to a hole in the second transport support member 10 (not shown). This hole is provided with the same thread as the hole 19.

Furthermore a locking screw 21 is included into the projecting device. The locking screw has a smooth, outer portion 22 with a screwdriver groove 23 and a threaded inner portion 24. The smooth portion fits into the holes 18 and 20 and the threaded portion fits into the hole 19 of the operating means 3 and in said hole in the transport support member 10. The locking screw 21 can in other words connect the operating means 17 with the adjustment means 3 so that the same can be pivoted manually, whereas the operating means without the locking screw in its position can be pivoted freely. The screw 21 can also connect the transport support members 4 and 10 so that the bar 7 can not be pivoted around its axis 5 but is locked relative to base plate 1. To the projecting device belongs only one locking screw 21, which is indicated by the fact that the locking screw which is shown close to the operating means 17 is shown with dotted and dashed lines.

When a picture is to be projected the picture is inserted into the picture position, determined by the picture holder 12. If the lamp 9 is lighted a luminous flow is issued from the light house 8 through said picture which should be a diapositive, through the objective unit 14. The beam pass issued from the objective unit 14 is to fall onto a projection surface, so that a projected picture 26 is formed. This picture is linear, if it is positioned opposite to the longitudinal axis through the objective unit and only then if a conventional projecting apparatus with an unchangeable straight bean pass is utilized. If one on the contrary wishes to lift or lower the picture by directing the projector apparatus upwards or downwards the picture will no longer be linear, but a rectangular picture passes instead over to the shape of a parallel trapezoid.

At the projector apparatus shown in the figure however the same is not inclined when changing the height position of the picture, but the base plate 1 and consequently the objective unit 14 will always be substantially right-angled to the projection plane. For the adjustment of the height position of the picture the operating means 17 is turned in connection with the projecting apparatus which is shown in the figure and to which the present invention relates. Then the locking screw 21 is to be inserted into the holes 18 and 19 so that the adjustment means 3 will be brought about. By means of its screw thread the adjustment means will upon its turning displace the ear 16 and consequently the whole objective unit 14 in a parallell motion upwards or downwards relative to the base plate 1. For the objective unit further control means other than the adjustment means can be arranged which however will not change the function of the device.

In connection with the parallell movement also the pins 15 will move upwards or downwards and bring about the forward arms of the bars 6, so that the bars are pivoted around the axis 5. Then the light house 8 will be raised or lowered. The picture holder 12 will not move, but is all time in the center of the pivoting motion.

The beam pass from the light house through the picture will by means of the position of the light house consequently extend obliquely into the objective untit 14 and will aslo leave the same obliquely upwards or downwards. In this way a displacement in height of the projected picture will be obtained in the way which is indicated by means of the line 27 in the figure. At this displacement the linearity of the picture will be maintained.

By the fact that the light house 8 is relatively heavy the forces on the described mechanism will be large if the projector is subjected to shocks and vibrations, which can take place during transportation. Further the equipment is easily damaged and requires a great, maintained precision. Therefore it is necessary that the members are secured relative to each other for transportation.

This is obtained by adjusting the adjustment means 3 by means of the operating means 17 in such a position that the transport support members 4 and 10 are positioned opposite each other with their holes (only the hole 20 is shown). Thereafter the locking screw 21 is screwed outwards and taken out of the hole 18 and is displaced to the hole 20 and screwed into the threaded hole in the transport support member 10. The light house 8 has now obtained an anchoring at its extreme end simultaneously as the objective unit is supported by means of the adjustment means 3. By the fact that the locking screw 21 is removed from the operating means, the operating means can not be utilized for turning the adjustment means. Any tension force can not unintentionally be applied to the mechanism from the object glass to the light house through the bars 6. In this connection it is prerequisite that the adjustment means 3 itself is not accessible for operation.

When the projecting apparatus will be utilized the transport safety device is released and the adjustment means is connected to the operating means by displacement of the locking screw 21.

The present invention can be modified within the frame of the accompanying claims. Consequently the projecting device can be modified to those members which are to be secured during transportation; the main intention is consequently to secure projector apparatuses for transportation, having relative to each other adjustable relatively heavy, easily damaged members without the necessity that they exactly have the form which is shown in the FIGURE. The locking screw which is shown can be replaced by another member, for example a pin with a snap connection or a different removable member which can be displaced between an operating means and a transport safety device. The operating means can naturally have a different form than the form of a wheel. If the operating means consists of for example a lever arm, this arm can simultaneously have the function as a locking means. Consequently it is imaginable that a lever arm for operation of an adjustment means is removed so that this member can not be operated, and is inserted into the transport safety device for locking the same. Also such an embodiment falls within the scope of the present invention. Further it will be clarified that the expression objective unit does not relate merely to the lens itself, but also includes conventional parts such as a tubular lens holder, to which the above mentioned two pins 15 and ear 16 are attached.

We claim:

1. Projecting device for the presentation of pictures comprising a frame, carrying means supported by said frame carrying a major portion of said device including a lens and a lamp housing, bearing means provided for movably supporting said carrying means on the frame, adjusting means provided for moving the carrying means relative to the frame into different positions of adjustment, operating means operable for actuating the adjusting means to move the carrying means, securing means provided for securing the carrying means to the frame to prevent said carrying means from being brought out of a transport position, said securing means including a first part located on the lamp housing and a second part supported on the frame, said parts being alignable in a securing position of the securing means corresponding to the transport position of said carrying means, and a locking means provided in a first position to be attached to the adjusting means and to the operating means to bring them in driving connection, and alternatively, in a second position, to be attached in the securing means connecting said first and second parts to secure the carrying means in said transport position, whereby when the locking means is in its first position the first and second parts of the securing means are not connected together and when the locking means is in its second position the adjusting means and operating means are not in driving connection with each other.

2. Projecting device for the presentation of pictures comprising a frame, carrying means for carrying a projecting lens and a lamp housing, bearing means carried by the frame and provided to pivotally support the carrying means between different positions of use, an adjusting screw means connected to the frame and to the carrying means to pivot the carrying means between its different postions, operating means operable to turn the screw means to pivot the carrying means, securing means including a first part connected to the frame, and a second part connected to the lamp housing, said parts being alignable with to each other in a securing position corresponding a predetermined transport position of the carrying means, and a locking means provided in a first position to be attached to the operating means and to be connected to the screw means bringing the operating means and the screw means in a driving connection and, alternatively, in a second position, to be attached in the securing means connecting the first and second parts to secure the carrying while aligned in said securing position to secure the carrying means in its transport position, said locking means comprising a single element which can be attached either in said first position to the operating means and connected to the screw means or in the second position attached to the first and second parts of the securing means connecting the same to each other.

3. Device according to claim 2, wherein said single element is a screw which can be screwed into the operating means and to be connected to the adjusting screw means and, alternatively, can be screwed into one of the parts of the securing means and connected to the other part of the securing means.

* * * * *